United States Patent

[11] 3,574,363

| [72] | Inventor | George T. Stephenson<br>Denton, Tex. (1406 Fannidella 133,<br>Carrollton, Texas 75006) |
|---|---|---|
| [21] | Appl. No. | 774,846 |
| [22] | Filed | Nov. 12, 1968 |
| [45] | Patented | Apr. 13, 1971 |

[54] LOCKING DEVICE
6 Claims, 6 Drawing Figs.

[52] U.S. Cl. .................................................. 287/21,
280/511
[51] Int. Cl. ...................................................... F16c 11/06
[50] Field of Search .......................................... 287/21,
(Ball Digest); 85/5 (B); 280/511, 513, 512, 507;
70/237

[56] References Cited
UNITED STATES PATENTS

| 1,272,486 | 7/1918 | McManis..................... | 280/513 |
| 1,328,109 | 1/1920 | Whitlock..................... | 70/237 |
| 2,143,322 | 1/1939 | Knobel, Jr. ................. | 280/513 |
| 2,571,349 | 10/1951 | Eckles....................... | 280/507 |
| 2,696,392 | 12/1954 | Case........................... | 280/513 |
| 2,755,105 | 7/1956 | Wells........................... | 280/513 |

*Primary Examiner*—David J. Williamowsky
*Assistant Examiner*—Andrew V. Kundrat
*Attorney*—John M. Harrison ABSTRACT: A locking device for securing a ball-type coupling to a base which includes a hollow cylindrical receiving cylinder adapted to receive the ball of the ball-type coupling, a series of spheres movably mounted in the periphery of the receiving cylinder, a securing cylinder adapted to fit over the receiving cylinder and engage the spheres, and a pair of hinged arms attached to the securing cylinder whereby the securing cylinder can be raised or lowered. The securing cylinder and receiving cylinder are so mechanically interrelated that when the ball is placed in the latter and the hinged arms are depressed, the securing cylinder is lowered into place over the receiving cylinder and the ball of a ball-type coupling is securely, but rotatably, locked inside the receiving cylinder.

PATENTED APR 13 1971

INVENTOR
GEORGE T. STEPHENSON

*John M. Harrison*
ATTORNEY

*INVENTOR*
GEORGE T. STEPHENSON

*ATTORNEY*

3,574,363

LOCKING DEVICE

BACKGROUND OF THE INVENTION

1. Field of the Invention

This invention relates to a new and improved coupling device whereby ball-type couplings can be rotatably secured to any desired surface. For example, the locking device can be inverted, mounted on the tongue of a conventional trailer, and fitted over the ball of a ball-type coupling which is affixed to the bumper of a car or truck. Alternatively, the device can be mounted in the bed of a truck to rotatably secure a trailer to the vehicle, while ensuring an extremely strong linkage characterized by maximum possible movement in essentially all directions.

2. Description of the Prior Art

Heretofore, various connecting apparatus have been developed to movably attach two or more bodies, utilizing ball-type couplings whereby rotation of one or more of the bodies with respect to the other is achieved. For example, there are a number of ball-type coupling devices readily available which are adapted to connect a trailer to a vehicle, whereby the trailer can be removed from the vehicle and reconnected thereto as desired.

Conventional ball-type coupling devices are characterized by many undesirable features. For example, many of these devices utilize a ball receiving member and a clamping means which, in combination, engage a large portion of the surface area of the ball in a ball-type coupling, and consequently cause excessive ball, receiving member, and clamping means wear due to friction. The excessive wear not only creates a safety hazard by causing a dangerously loose attachment, but also necessitates frequent maintenance of the coupling device and retards freedom of movement of the trailer with respect to the pulling vehicle. Many automobile accidents have been caused by failure of defective trailer coupling devices which resulted in collision between a freed trailer and a passing vehicle.

Another shortcoming frequently noted in trailer hitches of conventional design is that of dangerously weak coupling strength in certain trailer positions. For example, during travel over rough terrain, the trailer hitch is subjected to extreme stress applied through many different rotational angles of the trailer with respect to the pulling vehicle. More specifically, when the trailer is forced upwards with respect to the pulling vehicle, a great deal of friction is developed between the mounted ball, the ball receiving member, and the clamping means in conventional coupling devices. This friction creates resistance to the upward motion of the trailer and greatly increases the danger of failure of one or more of the trailer hitch components. At best, the high friction level creates a dangerous wear hazard which, in turn, increases the likelihood of hitch failure.

Still another problem frequently found in conventional hitching means of the ball-type coupling design in corrosion. This problem is magnified in coastal areas and during the winter season in the North, where exposure of the hitching device to a salty environment tends to accelerate corrosion. It is not at all uncommon for conventional hitches to "freeze" under such conditions, and considerable applied force is frequently necessary to loosen the device, which increase the likelihood of breakage.

With regard to those ball-type coupling trailer hitches which are mounted in the bed of a pickup truck or similar vehicle for connection with gooseneck-type trailers, a problem frequently arises due to the upward projection of the ball and mounting assembly from the bed of the truck. In addition to the above-noted disadvantages inherent in conventional trailer hitches, the pickup truck version substantially decreases the effective loading area of the truck bed which can be utilized.

Accordingly, an object of the invention is to provide an improved coupling means having substantial strength and yet permitting substantial freedom of rotational movement of the coupled bodies with respect to each other, and minimum wearing of the coupled bodies at the point of attachment.

Another object of the invention is to provide an improved locking device which is extremely maintenance-free and has very little tendency to "freeze" or corrode.

A still further object of the invention is to provide an improved trailer hitching device whereby a trailer can be securely fastened to a vehicle, the device providing maximum safety on the road by virtually ensuring that the trailer will not become unattached from the vehicle during travel over rough terrain.

Still another object of the invention is to provide a trailer hitch locking device which has greater strength at all angles of rotation of the trailer with respect to a pulling vehicle than conventional hitches.

A still further object of the invention is to provide a trailer locking device which is adapted to installation in the bed of a pickup truck or similar vehicle, whereby the conventional projecting ball and mounting assembly are eliminated.

SUMMARY OF THE INVENTION

These and other objects of the invention are provided in a locking device for securing the ball of a ball-type coupling to a base which includes the following elements:

1. A hollow receiving cylinder attached to the base and adapted to receive the ball in the hollow center of the receiving cylinder;
2. At least one lock means for securing the ball, the lock means being movably mounted in the wall of the receiving cylinder;
3. A means for positioning the lock means whereby when the ball is placed in the hollow center of the receiving cylinder, it is prevented from exiting the hollow center but is allowed rotational movement therein.

BRIEF DESCRIPTION OF THE DRAWINGS

The invention will be better understood in view of the following description presented with reference to the accompanying drawings.

DESCRIPTION OF THE PREFERRED EMBODIMENTS

Figure 1:
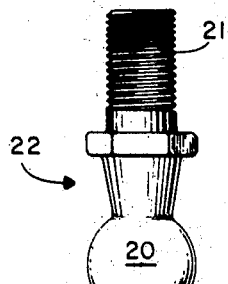
FIG. 1 of the drawings is a perspective view of a conventional ball-type coupling known in the prior art.

Referring now to FIG. 1 of the drawings, conventional ball-type coupling 22 is disclosed, which includes ball 20, which may be removable, and threaded member 21, designed to fixedly attach ball-type coupling 22 to a desired base member.

Figure 2:
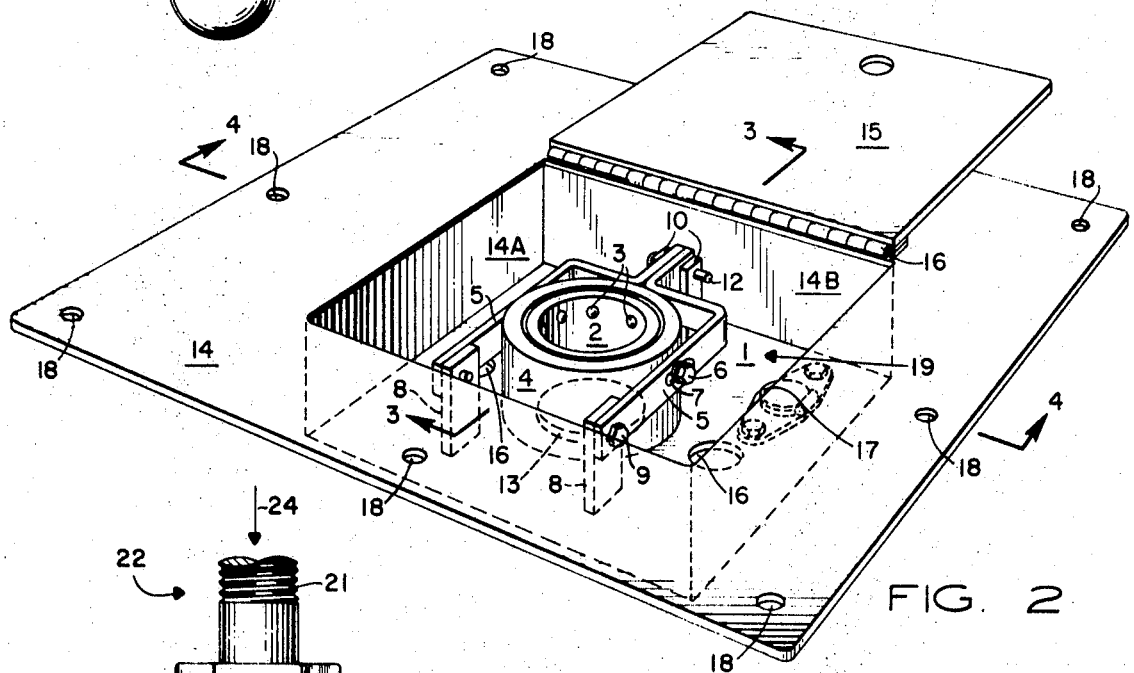
FIG. 2 is a perspective view of the locking device of the invention shown enclosed in a housing which is suitable for mounting in the bed of a pickup truck or similar vehicle.

FIG. 2 discloses the locking device of this invention, generally represented by reference numeral 19, and including base 1 upon which is fixedly attached hollow receiving cylinder 2 and brackets 8 and 10. Lock means 3, which may, for example, consist of one or more discs or spheres, is movably mounted in spaced relationship in the wall of receiving cylinder 2, and, in a preferred embodiment of the invention, lock means 3 are spherical members constrained to move horizontally and rotatably in the wall of receiving cylinder 2, and arranged therein in spaced relationship at points substantially equidistant from the top periphery thereof. Hollow securing cylinder 4 is adapted to fit concentrically over receiving cylinder 2 to provide a means for positioning lock means 3, and parallel slotted arms 5 are movably connnected to securing cylinder 4 through slot 7 by pin 6, preferably at the approximate midpoint of arms 5. One end of each arm 5 is hingedly coupled to brackets 8 by pins 9, and the free end of each arm 5 may be shaped whereby the ends become contiguous at brackets 10, and may be attached thereto through hole 11 by removable pin 12. Wear pad 13 is placed inside receiving cylinder 2 and rests on base 1; wear pad 13 is normally not fixedly attached to either receiving cylinder 2 or base 1, in order that it may be replaced as it wears.

In a preferred embodiment of the invention, locking device 19 is fixedly mounted inside a housing, generally represented by reference numeral 14 in FIG. 2, having sides 14a, 14b, 14c, and 14d (14c and 14d are not illustrated). Housing 14 is equipped with electrical outlet 17 and apertures 16 for receiving hydraulic couplings or the like, and is fitted with lid 15, which may be removable or attached to side 14b by hinge 16 and adapted to cover locking device 19 when locking device 19 is not in use. Base 1 of locking device 19 forms the bottom of housing 14 and mounting holes 18 may be used to secure housing 14 to the bed of a pickup truck or similar vehicle in such manner that sides 14a, 14b, 14c, and 14d and base 1 of housing 14, containing locking device 19, are recessed and adapted to fit flush with the bed of the truck or similar vehicle when top 15 is closed.

Figure 3:
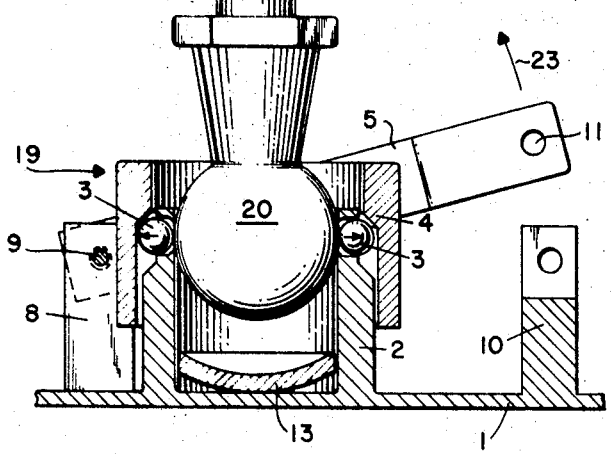
FIG. 3 is a sectional view along axis 3–3 as represented in FIG. 2, showing the locking device in disengaged position ready to receive the ball of a ball-type coupling.

Referring now to FIG. 3, the sectional view of locking device 19 in unlocked position shows a preferred configuration thereof. Locking device 19 is opened from its locked position by removing pin 12 (not illustrated) from hole 11 and lifting the free ends of arms 5 in the direction of arrow 23 to effect a displacement of securing cylinder 4 upwards with respect to receiving cylinder 2. In this displaced position, securing cylinder 4 is disengaged from lock means 3, which is preferably a plurality of metal spheres having a diameter larger than the wall thickness of receiving cylinder 2, thereby removing the pressure on lock means 3. Removal of this pressure allows metal spheres 3 to be horizontally and rotatably displaced in a direction indicated by the arrows superimposed thereon, away from the interior of receiving cylinder 2. Displacement of metal spheres 3 in the direction indicated by the arrows is preferably effected by providing receiving cylinder 2 with an outside top diameter smaller than the outside bottom diameter thereof and an essentially constant inside diameter, and securing cylinder 4 with an inside bottom diameter larger than the inside top diameter thereof. As shown in FIG. 3, such a design of receiving cylinder 2 and securing cylinder 4 provides adequate space between the inside bottom diameter of securing cylinder 4 and the outside top diameter of receiving cylinder 2, to allow metal spheres 3 to completely vacate, and ball 20 of ball-type coupling 22 to enter, the interior of receiving cylinder 2. The directional entry of ball 20 into receiving cylinder 2 is indicated by arrow 24.

Figure 4:
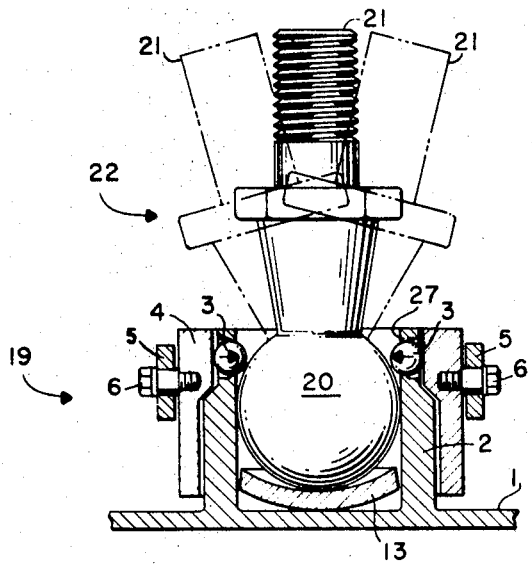
FIG. 4 is a sectional view along axis 4–4 as represented in FIG. 2, showing the locking device with the ball of a ball-type coupling securely locked therein.

Referring now to FIG. 4, ball 20 of ball-type coupling 22 is securely locked inside receiving cylinder 2 when the free ends of arms 5 are lowered, thereby causing securing cylinder 4 to depress and slidably engage metal spheres 3. Engagement of metal spheres 3 by securing cylinder 4 brings pressure to bear thereon and effects horizontal and rotational movement of metal spheres 3 in a direction indicated by the arrows superimposed thereon. The horizontal movement of metal spheres 3 causes a portion thereof to project inside receiving cylinder 2 at points in the wall thereof above ball 20, thereby preventing ball 20 from exiting the interior of receiving cylinder 2, but permitting substantial rotational movement of ball 20 (between wear plate 13 and metal spheres 3) and ball-type coupling 22, with respect to locking device 19. Metal spheres 3 are preferably prevented from falling into the inside of receiving cylinder 2 by a machined lip, reference numeral 27, formed on the inside of holes in the wall of receiving cylinder 2 adapted to receive metal spheres 3, at a point closest the inside wall of receiving cylinder 2.

After securing cylinder 4 is depressed into locked position onto receiving cylinder 2, arms 5 may be locked to secure ball 20 inside receiving cylinder 2 by inserting pin 12 through holes 11 in arms 5 and through registering holes in brackets 10 (see FIG. 1).

Figure 5:
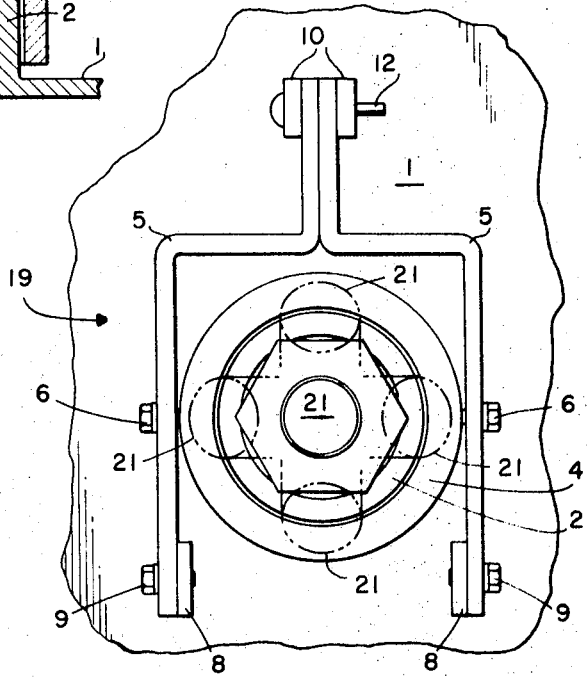
FIG. 5 is a top view of the locking device illustrating the freedom of movement of a ball-type coupling while the ball thereof is securely locked inside the device.

FIG. 5 illustrates the extent to which ball-type coupling 22 is permitted to rotate with respect to locking device 19 when ball 20 is securely locked inside receiving cylinder 2. Reference to this illustration and FIG. 4 shows that when so secured, ball-type coupling 22 is allowed to rotate 360° around an axis extending vertically from the center of ball 20, and at least 15° from this axis in all directions toward the top periphery of cylinder 2. Also depicted in FIG. 5 is a preferred means for locking arms 5 to brackets 10 by insertion of removable pin 12 in holes 11 (not illustrated in FIG. 5). Attachment of arms 5 to securing cylinder 4 by pins 6 and to brackets 8 by pins 9 is further exemplified.

Figure 6:
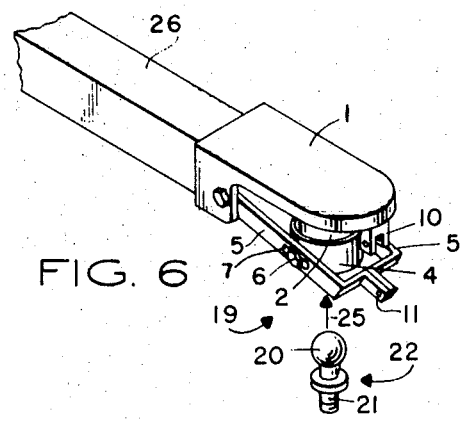
FIG. 6 is a perspective view of the locking device of this invention, inverted and mounted on the tongue of a conventional trailer for attachment with the ball of a ball-type coupling.

FIG. 6 of the drawings illustrates the convenient and significant flexibility of the locking device of this invention. In this inventive embodiment, locking device 19 is shown invertedly mounted on tongue 26 of a conventional trailer (not illustrated), at essentially the same point thereon where conventional coupling devices are usually attached. Base 1 forms an outermost projection of tongue 26 and receiving cylinder 2 is fixedly attached to base 1. Securing cylinder 4 is shown concentrically and downwardly displaced over receiving cylinder 2, thereby illustrating locking device 19 in unlocked position. Arms 5, hingedly attached to brackets 9 (not illustrated) and connected to securing cylinder 4 by pins 6 disposed through slots 7, are displaced downwardly with respect to base 1 and brackets 10 mounted on base 1. Ball 20 of ball-type coupling 22 is illustrated in conventional mounting position, threaded member 21 being adapted for attachment to the bumper or frame member of a truck, car, or other vehicle. When ball-type coupling 22 is so positioned, tongue 26 can be maneuvered to a point where locking device 19 is located directly above ball 20 of ball-type coupling 22, and lowered such that ball 20 enters receiving cylinder 2 and contacts wear pad 13 (not illustrated in FIG. 6). When ball 20 is so enclosed, arms 5 are moved upwards, thereby causing securing cylinder 4 to upwardly encircle receiving cylinder 2 and securely lock ball 20 of ball-type coupling 22 inside receiving cylinder 2. Tongue 26 is thereby securely, but rotatably, affixed to the bumper or frame member of a vehicle through the above-described connection between ball-type coupling 22 and locking device 19.

It will be recognized that many different variations of the inventive embodiment illustrated in FIG. 6, as well as other embodiments of the invention, are possible. For example, locking device 19 can be rotated 90° from the mounting illustrated in FIG. 6, to a position such that base 1 is fixedly secured to the end of tongue 26, where it is vertically positioned, and the free ends of arms 5 (or a single arm if only one is desired) project upwards. Such mounting of locking device 19 dictates a similar positioning of ball-type coupling 22 on a vehicle for attachment with locking device 19 in essentially the same manner as heretofore discussed. Alternatively, it is well within the disclosure of this invention to affix locking device 19 in upright position on the bumper or frame member of a car, truck, or other vehicle, and ball-type coupling 22 invertedly on tongue 26.

It will further be recognized that internal modifications of locking device 19 may be effected without departing from the scope of this invention. For example, referring to FIG. 6 of the drawings and the embodiment above-discussed characterized by horizontal mounting of locking device 19 and ball-type coupling 22, arms 5 can be eliminated from locking device 19 by spring-loading securing cylinder 4. In this manner, connection between a vehicle having ball-type coupling 22 horizontally mounted thereon, and a trailer having a tongue 26, to which is horizontally attached locking device 19, can be essentially automatically effect without the necessity of manipulating arms 5 by simply engaging ball 20 and receiving cylinder 2. It will be recognized that many other variations in the inventive concept are possible within the scope of the disclosed embodiments.

Referring again to FIG. 2 of the drawings, in a preferred aspect of the invention, receiving cylinder 2, metal spheres 3, securing cylinder 4, and arms 5 are provided with a protective coating to protect these elements of locking device 19 from corrosion. Suitable coatings are paint, epoxy, or a similar protective resin, or metals such as chromium and the like. Alternatively, the constituents of locking device 19 can be fabricated of corrosion-resistant materials such as stainless steel and the like.

From a consideration of the above-described embodiments of the invention, it will be appreciated that the locking device disclosed in this application is characterized by many useful features not found in conventional devices adapted for attachment to a ball-type coupling. The instant invention defines a locking device capable of providing greater strength with more freedom of movement than was heretofore possible with conventional hitching means. This important feature is due to the particular and unique design of Applicant's locking device which keeps friction between the ball of a ball-type coupling and the securing members of the device to a minimum. Referring again to FIGS. 2, 3, and 4 of the drawings, since ball 20 is allowed substantial rotational movement when locked inside receiving cylinder 2, the only member of locking device 19 to be subjected to substantial wear is wear pad 13, which is designed to receive this punishment and can be readily replaced.

One of the most significant advantages of the locking device disclosed in this invention lies in application of the embodiment whereby the device is mounted in a housing which is, in turn, installed in the bed of a pickup truck or similar vehicle. Under these circumstances, as heretofore pointed out and with reference to FIG. 2 of the drawings, locking device 19 is preferably recessed in housing 14. Thus, when locking device 19 is not coupled to the ball of a ball-type coupling mounted on a trailer, lid 15 can be closed flush with the truck bed to provide a flat load area having no inconveniently projecting ball-type coupling which presently exists in conventional hitching means.

Although the invention has been disclosed with a certain degree of particularity, it is understood that the present disclosure has been made only by way of example and that numerous changes in the details of construction and the combination and arrangement of parts may be resorted to without departing from the spirit and the scope of the invention as hereinafter claimed. Accordingly, the invention is to be limited only as defined in the claims.

I claim:

1. A locking device for securing the ball of a ball-type coupling to a base comprising:
   a. A hollow receiving cylinder attached to said base and adapted to receive said ball in the hollow portion thereof;
   b. At least one lock means for securing said ball, said lock means being movably mounted in the wall of said hollow receiving cylinder;
   c. A hollow securing cylinder having an inside bottom diameter larger than the inside top diameter thereof and adapted to encircle said hollow receiving cylinder in concentric relationship and engage said lock means whereby pressure is exerted on said lock means and whereby when said hollow securing cylinder is slidably displaced upwards with respect to said hollow receiving disengages said lock means and essentially relieves said pressure exertion thereon to allow removal of said ball from said hollow portion of said hollow receiving cylinder; and
   d. At least one arm attached to said hollow securing cylinder in movable relationship, said arm having a free end and an end hingedly connected to said base whereby when said free end of said arm is lifted, said hollow securing cylinder is displaced upwards and removal of said ball from said hollow portion of said hollow receiving cylinder is permitted.

2. A locking device for securing the ball of a ball-type coupling to a base comprising:
   a. A hollow receiving cylinder fixedly attached to said base and having a top wall of lesser thickness than the bottom wall, the hollow portion of said hollow receiving cylinder having an essentially constant diameter and being adapted to receive said ball;
   b. a plurality of metal spheres movably mounted in spaced relationship in said top wall of said hollow receiving cylinder at points substantially equidistant from the top periphery of said top wall, whereby essentially horizontal and rotatable movement of said metal spheres in said top wall is permitted;
   c. a hollow securing cylinder having an inside bottom diameter which is larger than the inside top diameter thereof and adapted to slidably encircle said hollow receiving cylinder in concentric relationship to engage and exert pressure on said metal spheres, whereby when said ball is placed in said hollow portion of said hollow receiving cylinder and said hollow securing cylinder is made to slidably encircle said hollow receiving cylinder, a portion of each of said metal spheres is projected into said hollow portion of said hollow receiving cylinder at points in said top wall above said ball and said ball is securely locked in said hollow portion of said hollow receiving cylinder; and
   d. a pair of essentially parallel arms, each having a free end and an end hingedly connected to said base, the approximate midpoint of said arms being attached to and spaced apart by said hollow securing cylinder in movable relationship, whereby when said free end of said arms is lifted vertically, said hollow securing cylinder is slidably displaced upwards with respect to said hollow receiving cylinder and is essentially disengaged from said plurality of metal spheres to release said pressure thereon and permit removal of said ball from said hollow portion of said hollow receiving cylinder.

3. The locking device of claim 2 wherein:
   a. said hollow receiving cylinder contains a wear plate adapted to fit in the hollow portion thereof whereby said base is protected from excessive wear; and
   b. said free end of said pair of essentially parallel arms is releasably affixed to said base when said hollow securing cylinder is concentrically placed upon said hollow receiving cylinder and said ball is securely locked in said hollow portion of said hollow receiving cylinder.

4. The locking device of claim 2, wherein said base, said hollow receiving cylinder, said hollow securing cylinder, and said pair of essentially parallel arms are enclosed in a housing having a hinged cover and fitted with means for connecting electrical conduits and the like, said housing being adapted to fit in the bed of a truck whereby when said ball is not attached to said hollow receiving cylinder and said hinged cover is closed, said housing fits essentially flush with said bed.

5. The locking device of claim 2, wherein said base, said hollow receiving cylinder, said hollow securing cylinder, and said pair of essentially parallel arms are mounted on a trailer or the like for securing said trailer or the like to a ball-type coupling on a vehicle.

6. A locking device for securing the ball of a ball-type coupling to a base comprising:
   a. a hollow receiving cylinder attached to said base and adapted to receive said ball in the hollow portion thereof;
   b. at least one lock means for securing said ball, said lock means being movably mounted in the wall of said hollow receiving cylinder; and
   c. means for positioning said lock means whereby when said ball is placed in said hollow portion of said hollow receiving cylinder, it is prevented from exiting said hollow portion but is allowed substantial rotatable movement therein; and
   e. said hollow receiving cylinder, said lock means, and said means for positioning said lock means are enclosed in a housing having a removable cover, said base defining the bottom of said housing.